July 2, 1935.  E. SUTTER  2,006,876
APPARATUS FOR INCREASING THE FLUIDITY OF CHEESE
Filed May 18, 1931
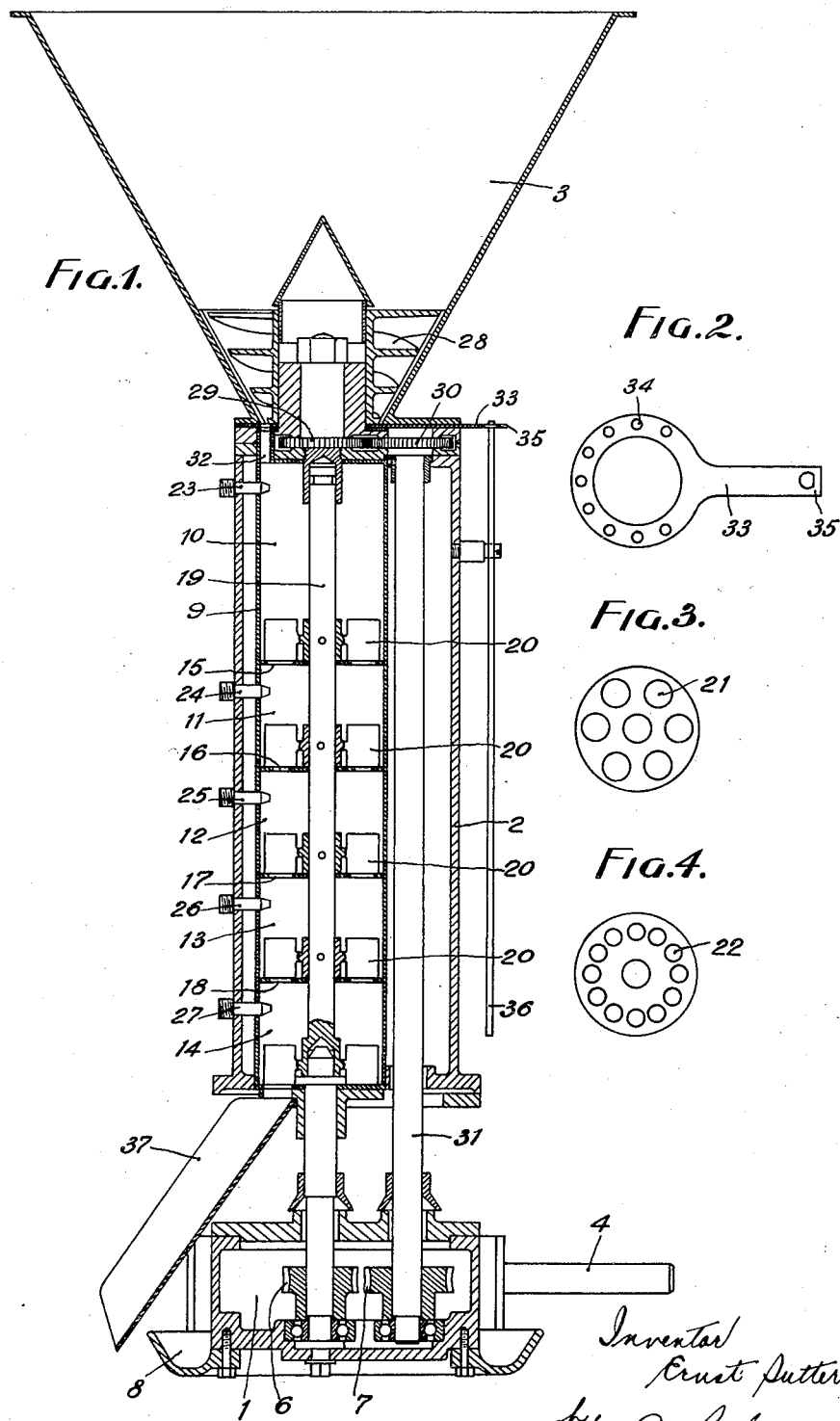

Patented July 2, 1935

2,006,876

UNITED STATES PATENT OFFICE 2,006,876

APPARATUS FOR INCREASING THE FLUIDITY OF CHEESE

Ernst Sutter, Berthoud, Switzerland

Application May 18, 1931, Serial No. 538,087
In Switzerland May 28, 1930

1 Claim. (Cl. 99—2)

The invention relates to a process and apparatus for moulding cheese or the like.

Several processes and apparatuses are known to be applicable to the production of cheese in boxes, by which steam is put in direct contact with the cheese in the mass or serves in another manner for the heating thereof. After the mass is treated, it is removed from the apparatus, after having remained there for a sufficiently long time for it to be entirely melted, with the result that during this process a part of it is thus overheated. This overheating, however, coupled with the fact that the production is discontinuous, is not desirable.

Continuously working apparatuses are also known, wherein the mass is forced in under pressure, for example, by means of pumps provided with gearing, through ducts of varying shapes and heated to different temperatures. Experience has, however, shown that the use of such comparatively violent methods may also have a bad effect on the product obtained.

Another defect inherent in various apparatus already known resides in the fact that the regulation of the feed takes place by varying the discharge of the mass. This results in momentary accumulations also capable of giving rise to overheating.

In the process according to the present invention, the mass is passed uninterruptedly through several heated chambers and the heating of these chambers and the admission of the mass in the first chamber is so regulated that in passing from one chamber to the other the mass is gradually melted in order that it may be in a condition to flow freely out of the last chamber.

In a suitable arrangement according to the invention the apparatus comprises a series of heated chambers, interconnected by apertures the size and number of which are suited to the degree of fluidity of the mass before passing through them, and means intended to regulate the heating as well as the admission of the mass, all of which has the object of effecting a gradual and continuous heating of the mass.

In order that the invention may be fully understood it will now be described with reference to the accompanying drawing by way of example in which:—

Figure 1 is an elevation of the apparatus in axial section, and

Figures 2 to 4 show details of the apparatus.

The apparatus as shown in Figure 1 is principally composed of a socle 1 upon which is mounted a frame 2, surmounted by a hopper 3.

The socle 1 into which the control shaft 4 of the machine penetrates, contains gears 6 and 7 actuated by the shaft 4 and intended for the control of the mixing means and of the means for charging the machine. A duct 8 surrounding the socle 1 is intended to receive waste water or other wet products which may escape from the frame 2.

The frame 2 contains a sleeve 9 divided internally into five chambers 10, 11, 12, 13 and 14 by plates 15, 16, 17 and 18. Two of these plates are represented in Figures 3 and 4. They are provided with central apertures through which passes the shaft 19 controlling the mixing devices 20, and with a series of apertures 21 or 22 concentric in relation to the shaft 19 and intended for the passage of the melting mass. Tubes 23, 24, 25, 26 and 27 serve to conduct the steam into the chambers, which steam heats the mass whilst being absorbed by it.

The hopper 3 contains a screw 28 intended for the charging of the first chamber 10, which screw forces downwards the mass introduced into the hopper. Gearing 29, 30 sets the screw 28 into motion through the medium of the shaft 31 disposed externally in relation to the sleeve 9.

Around the toothed wheel 29 of the aforesaid gearings a plurality of apertures 32 are arranged for the passage from the hopper to the first chamber 10 of the mass to be treated. A lunette 33 represented in Figure 2, has apertures 34 corresponding to the apertures 32 of the toothed wheel 29 on which toothed wheel it is placed. Owing to this, when slightly turning the lunette 33 through the medium of a lever arm 35 and the oscillating bar 36, the size of the passage offered by the apertures 32 and 34 to the mass propelled by the screw 28 of the hopper 3 may be regulated.

Finally, at the base of the apparatus a gutter 37 is provided for the flowing off of the melted mass.

The apparatus described works as follows:—

By the shaft 4 being put in motion, the mixing means 20, as also the screw 28 are operated thereby. Steam is projected through the pipes 23, 24, 25, 26 and 27, into the chambers 10, 11, 12, 13 and 14 respectively, the pipes being for this object connected to a steam generator by conduits provided with regulating means. Such regulating means could also however be provided on the pipes themselves. In addition to this, it is well to interpose steam filters between the pipes and the steam generator.

The mass to be treated is now poured into the hopper 3, propelled by the screw 28 and conducted through the apertures 32, 34, which must be made to coincide, into the first chamber 10. There, it is heated by contact with the steam which it absorbs and is thereby softened. The mixing means 20 of this first chamber 10 propels the softened mass to a point above the apertures of the plate 15, so that it falls into the following chamber 11. In this chamber, the mass is once again heated, and will consequently again become more fluid and, propelled by the mixing means 20, it will fall through the aperture of the plate 16 into the chamber 12.

The functions described are thus repeated from chamber to chamber and the fluidity of the mass accordingly becomes greater as the mass passes through the apparatus, so that, finally, it is in a condition to flow off through the gutter 37 into the moulds, packing receptacles, etc., intended to receive it.

In order to ensure regular and continuous movement of the mass through the apparatus, it will be sufficient to adapt the size and number of the apertures of the plates 15, 16, 17 and 18 separating the chambers one from the other relative to the degree of fluidity acquired by the mass during its displacement. In the same manner, the supply of steam from the pipes 23, 24, 25, 26 and 27, (the last of which 27 or the last two 26 and 27, may in certain cases be left inactive), will be regulated. These various regulations can, of course, only be determined in operation.

The supply of the mass to the apparatus can be regulated by displacement of the lunette 33 which will preferably be provided with a stop preventing the complete closing of the apertures 32, the object of which is to prevent the screw 28 working the mass without this latter being enabled to advance.

As may be seen, the apparatus according to the invention realizes a gradual and continuous heating of the mass, without the latter being able to accumulate at any point of its course through the apparatus and to be overheated for this reason or any other.

It is evident that, although the apparatus as shown in the drawing works in a vertical position, which is simpler, there is no obstacle to its working in a horizontal position, if mixing means in the form of screws or propellers intended to feed the mass through the machine are provided.

It is evident, also, that the heating by steam in the manner described, may be replaced by steam-heating by coils, by heating by water and in a general manner by any adequate heating means.

Finally, and as stated by the title of the invention, the process and the apparatus described may be applied to any mass before undergoing a treatment similar to that of cheese, with which latter the invention is however more particularly applicable.

The number of chambers of the apparatus according to the invention may be any such as is desired and is not restricted by that of the example shown.

The introduction of the mass into the apparatus has been represented as being in an axial direction in relation to this latter, but it is evident that the mass could be introduced radially, that is to say through the side of the first chamber.

The plates 15, 16, 17 and 18 separating the chambers one from the other, have been assumed to be fixed, but could also be enabled to have a rotary movement, for example in either the same or the direction inverse to that of the mixing means.

Having now particularly described and ascertained the nature of my said invention and in what manner the same is to be performed, I declare that what I claim is:—

Apparatus for increasing the fluidity of a plastic mass, comprising a vertically disposed housing, a cylindrical casing inside the housing having a plurality of superimposed chambers with perforated floors, a helical screw in connection with one end of the casing for feeding the mass into the adjacent chamber, a propelling shaft in the casing in coincidence with the axis of the casing for forcing the mass as it reaches a high degree of plasticity into the next succeeding chamber, a parallel shaft intermediate the housing and the casing in connection with the propelling shaft for actuating said propelling shaft, and conduits disposed in the upper part of each chamber for variably and regulably supplying heat to the plastic mass in its movement toward the opposite end of the casing.

ERNST SUTTER.